United States Patent [19]

Washizu

[11] Patent Number: 4,915,420
[45] Date of Patent: Apr. 10, 1990

[54] CONNECTOR FOR CONNECTING PIPE

[75] Inventor: Katsushi Washizu, Shizuoka, Japan

[73] Assignee: Usui Kokusai Sangyo Kaisha Ltd., Shizuoka, Japan

[21] Appl. No.: 318,891

[22] Filed: Mar. 3, 1989

[30] Foreign Application Priority Data

Mar. 5, 1988 [JP] Japan .................................. 63-52383

[51] Int. Cl.⁴ .............................................. F16L 39/00
[52] U.S. Cl. ...................................... 285/39; 285/319; 285/93
[58] Field of Search ................. 285/319, 39, 169, 174, 285/351, 93

[56] References Cited

U.S. PATENT DOCUMENTS

| | | | |
|---|---|---|---|
| 2,892,991 | 6/1959 | Beebee | 285/93 X |
| 3,826,523 | 7/1974 | Eschbaugh | 285/319 X |
| 4,035,005 | 7/1977 | Devincent | 285/319 |
| 4,637,636 | 1/1987 | Guest | 285/39 X |
| 4,681,351 | 7/1987 | Bartholomew | 285/319 |
| 4,778,203 | 10/1988 | Bartholomew | 285/319 X |
| 4,781,400 | 11/1988 | Cunningham | 285/39 |
| 4,793,637 | 12/1988 | Laipply | 285/39 |

Primary Examiner—Randolph A. Reese
Assistant Examiner—Carol I. Bordas
Attorney, Agent, or Firm—Anthony J. Casella; Gerald E. Hespos

[57] ABSTRACT

A connector for connecting a pipe includes a joint body internally formed with stepped small and large diameter chambers, sealing members attached to inside of the small diameter chamber, a bush for sustaining the sealing members, and a holder having pawls engaging with a pipe annular swelling portion when the pipe has completely been connected. The connector also includes a connection confirmative member caught by the holder and having a pawl impinging upon the swelling portion. The confirmative member disengages from the holder when the pipe has completely been connected.

9 Claims, 3 Drawing Sheets

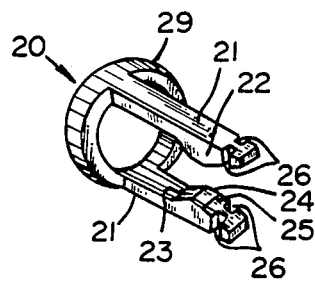
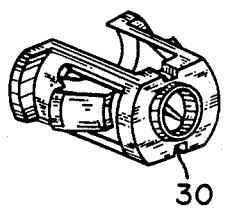
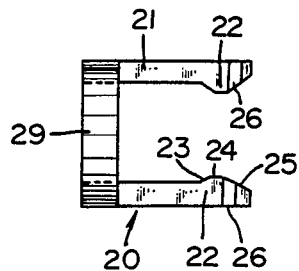
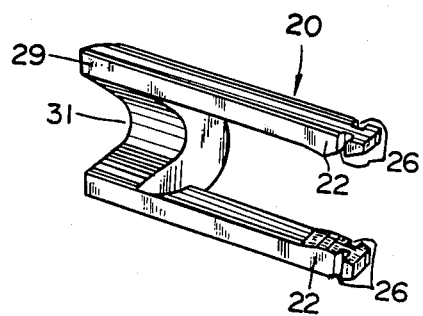
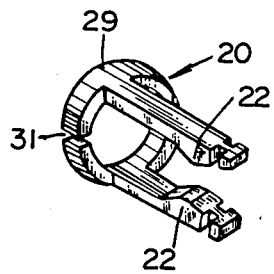
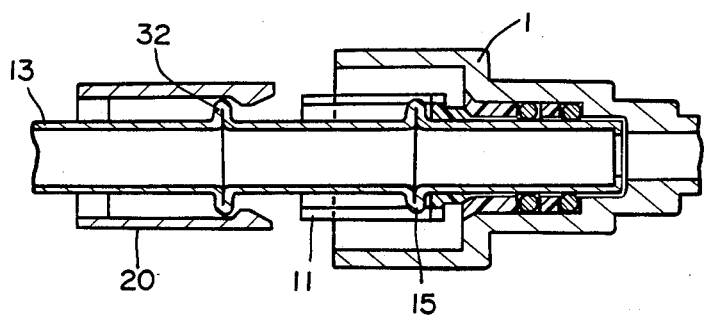

CONNECTOR FOR CONNECTING PIPE

BACKGROUND OF THE INVENTION:

1. Field of the Invention:

The present invention relates to a connector for connecting a pipe which is capable of confirming from outside that a pipe having a small diameter of 20 mm or less is securely connected by use of a metallic or resinous connector, the pipe being disposed as a supply pipe for supplying a fluid like oil or air to automobiles or machineries, equipments and systems.

2. Description of the Prior Art:

A variety of connectors have heretofore been employed for connecting pipes together through which a fluid like oil or air flows. Further, a good number of related proposals have been made. For example, one well-known connector consists of: a joint body having its axial core interior formed with a stepped small diameter chamber communicating with a communication passageway of a hose connecting portion provided on the top side and with a stepped enlarged diameter installing chamber disposed behind the former; a sealing member attached to the inside of the small diameter chamber; a bush member, likewise accommodated in the inside thereof in rear of the sealing member, for sustaining the sealing member; and a holder having pawls engaging with the rear side of a pipe annular swelling portion when the pipe has completely been connected.

This type of conventional connector, however, presents the following problems. The tight connection requires a step of intruding the pipe by a relatively large force. Where a pipe for use with, e.g., an automobile has to be connected in a confined space, it is difficult to confirm from outside whether the connection has completely been effected or not. Even if the connection remains incomplete, no axial force is exerted from outside, and the internal pressure is still low. In this state, a leakage does not occur. Therefore, the incomplete connection can not be detected by taking a glance at the appearance, and it follows that there is produced inconvenience of causing the fluid leakage after being placed on the market.

SUMMARY OF THE INVENTION:

It is a primary object of the present invention which obviates the above-described problems to provide a means capable of confirming from outside whether the connection to a connector is completely performed or not.

In order to eliminate the foregoing problems and accomplish this object, the present inventor has assiduously pursued a study and come to the conclusion that the foregoing object can be met by providing a connection confirmative member having pawls which may disengage from a holder of the connector by causing expansion in cooperation with an annular swelling portion of the pipe which gives a pressure thereto when the pipe has completely been connected. The present invention has thus been attained.

Namely, according to one aspect of the invention, there is provided a connector comprising: a joint body having its axial core interior formed with a stepped small diameter chamber communicating with a communication passageway of a hose connecting portion provided on the top side thereof and with a stepped enlarged diameter installing chamber disposed behind the former; sealing members attached to the inside of the small diameter chamber; a bush member, accommodated therein in rear of the sealing members, for sustaining the sealing members; and a holder having pawls engaging with the rear side of a pipe annular swelling portion when the pipe has completely been connected, characterized by a connection confirmative member caught by the holder and including at least a single piece of pawl capable of impinging upon the pipe annular swelling portion, the confirmative member disengaging from the holder when the pipe has completely been connected.

BRIEF DESCRIPTION OF THE DRAWINGS:

Other objects and advantages of the invention will become apparent during the following discussion in conjunction with the accompanying drawings, in which:

FIGS. 8(A) and 8(B) are perspective and side views respectively showing still another embodiment of the connection confirmative member used in the present invention;

FIG. 9 is a perspective view showing one example of the holder when employing the connection confirmative member depicted in FIG. 8;

FIGS. 10 and 11 are perspective views each showing a different embodiment of the connection confirmative member used in the present invention; and FIG. 12 a vertical sectional view depicting another embodiment of the connector of the present invention when using the connection confirmative member depicted in FIG. 8.

Figure 1:
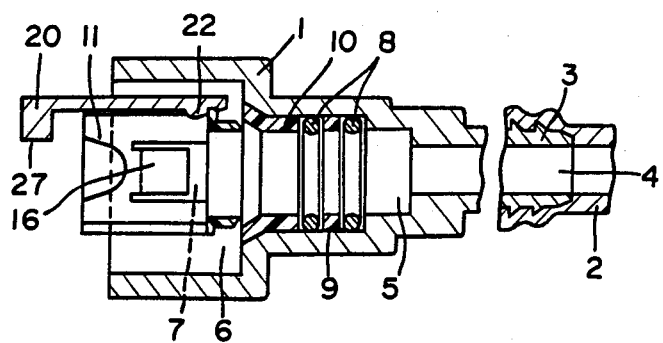
FIG. 1 is a vertical sectional view illustrating one embodiment of a connector according to the present invention.
Figure 2:
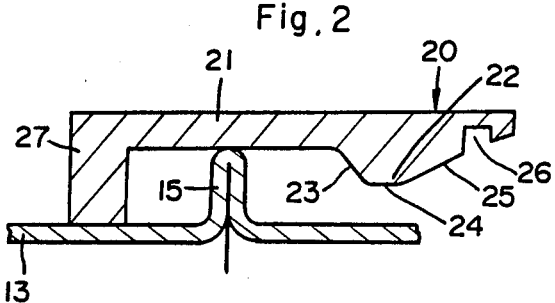
FIG. 2 is a vertical sectional view showing one embodiment of a connection confirmative member employed in the present invention.
Figure 3:
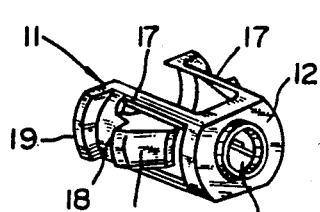
FIG. 3 is a perspective view depicting one example of a holder used for the connector according to the present invention.

DETAILED DESCRIPTION OF THE PREFERRED EMBODIMENTS:

Turning first to FIGS. 1 through 5, there is illustrated a first embodiment. A metallic or resinous joint body generally indicated at 1 has its axial core interior formed with a stepped small diameter chamber communicating with a communication passageway 4 passing through a connecting portion 3 connected to a flexible hose 2 projecting at one tip portion thereof and with a stepped enlarged diameter installing chamber 6 disposed in rear of small diameter chamber 5. Joint body 1 also includes stopping holes 7 perforated in symmetric positions in the side wall of installing chamber 6. The numeral 8 represents a sealing member made of an elastic material such as rubber. A plurality of sealing members 8 are, if desired, attached to the interior of small diameter chamber 5 together with a bush member 10, disposed behind the sealing members, for sustaining the sealing members, while a spacer 9 interposed therebetween. The numeral 11 designates a holder formed of an elastic resinous or metallic material. Referring to FIG. 3, perforated in a tabular member 12 provided on the top side thereof is an insertion hole 14 having a diameter enough to admit the insertion of a pipe 13 like a metallic pipe or a resinous tube. Holder 11 has a pair of elastic pawl pieces 17 including pawls 16 which are directed towards tabular member 12, these pawls impinging upon the outer periphery of pipe 13 and engaging with the rear side of an annular swelling portion 15 shaped on pipe 13 when inserting pipe 13 impinges upon the outer periphery of pipe 13. The rear end of holder 11 is caught by joint body 1 between rear surfaces 18 of pawls 16 and collars 19 so provided at the rear ends of elastic pawls pieces 17 as to jut out by engaging rear surfaces 18 of pawls 16 with stopping holes 7 of joint body 1. Thus, holder 11 as a whole acts to hold pipe 13 to prevent its removal by engaging pawls 16 with the rear side of annular swelling portion 15 of pipe 13. Note that holder 11 can readily be demounted from joint body 1 even when holding pipe 13 by pulling out the holder while thrusting collars 19 of elastic pawl pieces 17 inwards in the radial direction. The numeral 20 denotes a connection confirmative member made of an elastic material. As illustrated in FIG. 2, confirmative member 20 has a pawl unit 22 formed inwardly of one tip portion of a slender and slightly curved flat member 21. Confirmative member 20 is also formed with a first oblique surface 23 having an angle of sharp inclination enough to butt against the front surface of annular swelling portion of pipe 13, a top portion 24 contiguous to the first oblique surface and a second oblique surface 25 having an angle of moderate inclination. Chased in second oblique surface 25 in the radial direction is a stopping groove 26 engaging with tabular member 12 of holder 11. At the other end of flat member 21, there is provided a protrudent leg 27 impinging upon the outer peripheral surface of pipe 13. Connection confirmative member 20 is installed together with holder 11 within installing chamber 6 of joint body 1 by permitting stopping groove 26 to engage with tabular member 12 of holder 11 (FIG. 1).

Figure 4:
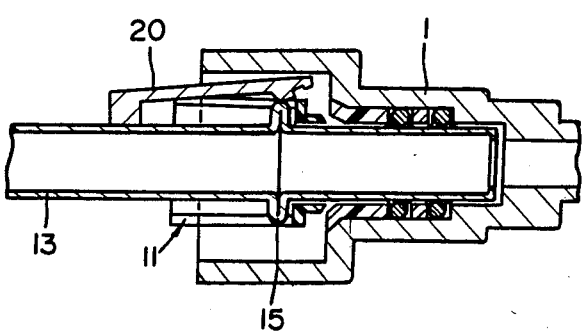
FIG. 4 is a vertical sectional view showing one example when inserting a pipe into the connector of the present invention.
Figure 5:
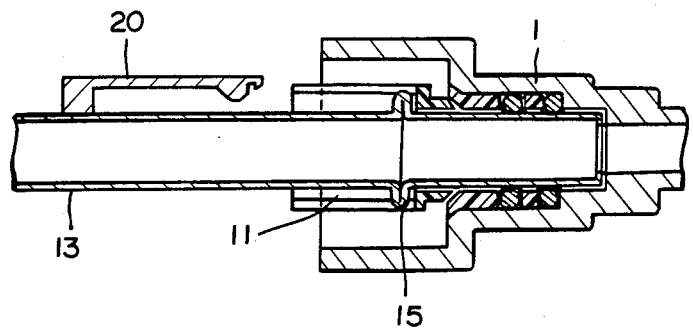
FIG. 5 is a vertical sectional view depicting a situation where the connection confirmative member is taken apart and comes out after the pipe has completely been connected to the connector of the present invention.

Pipe 13 is inserted into the connector and connected thereto, and annular swelling portion 15 butts against pawls 16 of holder 11 to gradually expand the pawls, thus further intruding pipe 13. At this time, as annular swelling portion 15 moves forward along first oblique surface 23 of pawl unit 22 of connection confirmative member 20, pawl unit 22 is expanded, with the result that top portion 24 runs on annular swelling portions 15 (FIG. 4). The rear side of annular swelling portion 15 is caught by pawls 16 of holder 11, thereby securely connecting pipe 13. In such a state, connection confirmative member 20 becomes removable (FIG. 5) in the axial direction by dint of a force reverting to the inside and by the action of annular swelling portion 15 of pipe 13 in cooperation with the oblique surfaces of connection confirmative member 20. This arrangement permits the confirmation from outside as to whether or not pipe 13 is normally connected with certainty. Incidentally, the removed connection confirmative member can repeatedly be used in the above-described manner.

Figure 6:
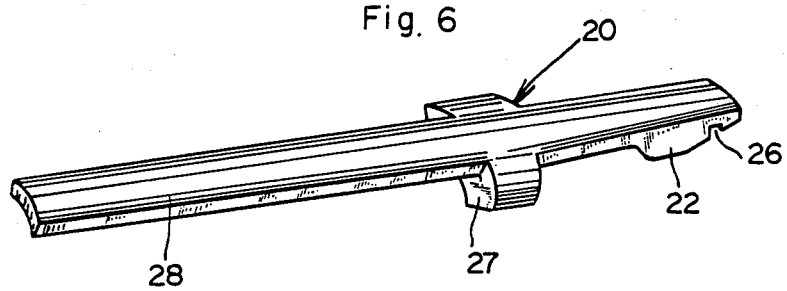
FIGS. 6 and 7 are perspective views each showing a different embodiment of the connection confirmative member employed for the connector of the present invention.

Referring to FIG. 6, there is shown a second embodiment. In addition to the construction of connection confirmative member 20 employed in the first embodiment, connection confirmative member 20 of the second embodiment fitted with a handle 28 projecting outwardly of the connector. Connection confirmative member 20 is usable in the same way and has the same effects as those in the previous embodiment. The operation of confirmative member 20 is further facilitated by proving it with handle 28.

Figure 7:
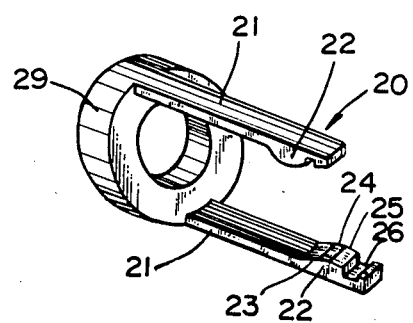

In accordance with a third embodiment depicted in FIG. 7, leg 27 of connection confirmative member 20 in the embodiments of FIGS. 1 to 5 is omitted, and pawl unit 22 is arranged to be a pair of pawl pieces facing to each other. The pawl pieces are joined by an annular member 29, thus constituting connection confirmative member 20. The pair of pawl pieces 22 are forced to engage with tabular member 12 of holder 11 from both sides as in the first embodiment, thus installing connection confirmative member 20 within joint body 1. Connection confirmative member 20 may be employed in the same manner as that in the first embodiment and also exhibits the same effects.

FIG. 8 shows a fourth embodiment wherein the pair of pawl pieces 22 are joined by annular member 29 as in the third embodiment. However, stopping grooves 26 are formed on both sides in the peripheral directions of pawl pieces 22. For connection confirmative member 20, as depicted in FIG. 9, there is used holder 11 including notched grooves 30 chased in tabular member 12 provided with no elastic pawl piece 17 of holder 11 which are shown in FIG. 3. Pawl pieces 22 of connection confirmative member 20 engage with notched grooves 30 of holder 11. Connection confirmative member 20 may be employed in the same way as that in the preceding embodiments and also yields the same effects.

Turning to FIG. 10, there is illustrated a fifth embodiment in which connection confirmative member 20 has a notch 31 formed in annular member 29 by which the pair of pawl pieces are connected. Connection confirmative member 20 can be used in the same manner as that in the fourth embodiment. After tightly connecting pipe 13, connection confirmative member 20, which has been detached and come out, is demounted from pipe 13 by expanding notch 31. The connection confirmative member can be reused.

FIG. 11 shows a sixth embodiment wherein notch 31 formed in annular member 29 of connection confirmative member 20 is further enlarged. Connection confirmative member 20 is usable in the same way as that in the fifth embodiment and also exhibits the same effects.

In the case of employing connection confirmative member 20 provided with annular member 29 formed with no notch 31 shown in the fourth embodiment (FIG. 8), as depicted in FIG. 12, a second annular swelling portion 31 similar to annular swelling portion 15 is shaped in a proper position of pipe 13. With this arrangement, the movement after connection confirmative member 20 has been taken out can be regulated. Further, as shown in FIGS. 7 and 11, the annular member 29 is made thick to contact its inner peripheral surface with the outer peripheral surface of the pipe 13, whereby the centering and placement of the connection confirmative member 20 can easily be effected.

The following excellent effects can be seen in the connector of the present invention. Engaged with the holder of the connector is the connection confirmative member capable of releasing the engagement when impinging upon the annular swelling portion of the pipe in a case where the pipe has reached the normal position and completely been connected with certainty. Based on this constitution, the connection confirmative member is taken apart from the holder and comes out of the connector when the pipe has normally surely been connected. Consequently, it is feasible to readily judge from outside whether a well-connected condition is present or not by visual observation and to prevent misconnection of the pipe.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A connector for connecting a pipe having an annular swelling adjacent an end thereof to a hose, comprising:
   a joint body having opposed first and second ends and an axial core interior extending therebetween, said axial core interior being formed with a stepped small diameter chamber communicating with a communication passageway of a hose connecting portion provided on the first end of said joint body, and with a stepped enlarged diameter installing chamber disposed behind said small diameter chamber at the second end of the joint body; sealing members attached to the inside of the small diameter chamber; a bush member, accommodated intermediate said sealing members and the second end of the joint body; and a holder having pawls engaging with the pipe annular swelling portion when said pipe has completely been connected and having means for engaging the holder in the axial core of the joint body, characterized by a connection confirmative member caught by said holder and including at least a single piece of pawl capable of impinging upon said pipe annular swelling portion, said connection confirmative member disengaging from said holder when said pipe has completely been connected.

2. The connector as set forth in claim 1, wherein said connection confirmative member comprises a slender member projecting from the pawl of the connection confirmative member a sufficient distance such that said slender member projects beyond the second end of said joint body.

3. The connector as set forth in claim 2, wherein said connection confirmative member further includes a handle jetting out.

4. The connector as set forth in claim 1, wherein said connection confirmative member consists of a pair of pawl pieces disposed in generally opposed relationship with each other and an annular member for connecting said pawl pieces.

5. The connector as set forth in claim 4, wherein said annular member is partly formed with a notch for permitting expansion of the annular member for disengagement of the connection confirmative member from the pipe.

6. The connector as set forth in claim 4, wherein said annular member is made thick to contact its inner peripheral surface with the outer peripheral surface of said pipe.

7. The connector as set forth in claim 1, wherein said holder has a tabular member generally at one axial end thereof, and said pawl of said connection confirmative member being composed of a first oblique surface facing the second end of the joint body and a second oblique surface facing away from the second end of the joint body, said second oblique surface being chased with a groove formed in the radial direction, for engaging with said tabular member prior to complete connection of the pipe with the connector.

8. The connector as set forth in claim 1, wherein said holder includes a tabular member generally at one axial end thereof formed with notched grooves in its outer peripheral portion, and said pawl unit of said connection confirmative member consists of a first oblique surface facing the second end of the joint body and a second oblique surface facing away from the second end of the joint body, said second oblique surface being chased with a pair of stopping grooves, formed in the peripheral directions, for engaging with said notched grooves of said tabular member prior to complete connection of the pipe with the connector.

9. The connector as set forth in claim 1, wherein a spacer is interposed between said plurality of sealing members.

* * * * *